US012398952B2

(12) United States Patent
Zhang et al.

(10) Patent No.: US 12,398,952 B2
(45) Date of Patent: Aug. 26, 2025

(54) WASTE ARGON SEPARATION SYSTEM AND METHOD CAPABLE OF REDUCING EMISSION OF CRYOGENIC WASTE ARGON

(71) Applicant: SHANGHAI LIFENGAS CO., LTD, Shanghai (CN)

(72) Inventors: Zhengxiong Zhang, Shanghai (CN); Andy Hao, Shanghai (CN); Jax Zhu, Shanghai (CN); Qinyou Tang, Shanghai (CN); Mingxing He, Shanghai (CN); Huaqin Liu, Shanghai (CN); Lin Wang, Shanghai (CN)

(73) Assignee: SHANGHAI LIFENGAS CO., LTD, Shanghai (CN)

( * ) Notice: Subject to any disclaimer, the term of this patent is extended or adjusted under 35 U.S.C. 154(b) by 21 days.

(21) Appl. No.: 18/764,361

(22) Filed: Jul. 4, 2024

(65) Prior Publication Data
US 2025/0093095 A1    Mar. 20, 2025

Related U.S. Application Data

(63) Continuation of application No. PCT/CN2024/093087, filed on May 14, 2024.

(30) Foreign Application Priority Data

Sep. 18, 2023  (CN) .......................... 202311197417.7

(51) Int. Cl.
*F25J 3/02*    (2006.01)
*F25J 3/04*    (2006.01)

(52) U.S. Cl.
CPC .......... *F25J 3/0285* (2013.01); *F25J 3/04927* (2013.01); *F25J 2205/60* (2013.01); *F25J 2210/58* (2013.01); *F25J 2215/58* (2013.01)

(58) Field of Classification Search
CPC .... F25J 3/0285; F25J 3/04927; F25J 2205/60; F25J 2210/58; F25J 2215/58
See application file for complete search history.

(56) References Cited

U.S. PATENT DOCUMENTS 3,807,185  A  *  4/1974  Forg ........................ F25J 3/0257
                                                   62/934
3,922,150  A  * 11/1975  Yusa .......................... F25J 3/08
                                                   95/127

(Continued)

*Primary Examiner* — Frantz F Jules
*Assistant Examiner* — Webeshet Mengesha
(74) *Attorney, Agent, or Firm* — Ying-Ting Chen

(57) ABSTRACT

The present application discloses a waste argon separation system capable of reducing emission of cryogenic waste argon. The waste argon separation system capable of reducing emission of cryogenic waste argon includes a valve bank, at least two adsorption towers, sewage discharge channels having at least the same number as the adsorption towers, a gas inlet component, and at least one argon reflux component. The valve bank includes a gas inlet valve, an analytic control valve, and at least two sewage discharge valves. The top of each of the adsorption towers is provided with an argon-rich gas outlet, and the argon-rich gas outlet at the top of each of the adsorption towers is connected to each other to form a regeneration channel. The argon-rich gas outlet at the top of each of the adsorption towers is further connected to an argon-rich gas outlet channel.

16 Claims, 3 Drawing Sheets

(56) References Cited

U.S. PATENT DOCUMENTS

| | | | | |
|---|---|---|---|---|
| 4,144,038 | A * | 3/1979 | Armond | B01D 53/04 |
| | | | | 95/138 |
| 4,153,428 | A * | 5/1979 | Saunders | C07C 7/005 |
| | | | | 95/143 |
| 4,477,265 | A * | 10/1984 | Kumar | F25J 3/04733 |
| | | | | 95/138 |
| 4,752,311 | A * | 6/1988 | MacLean | F25J 3/0285 |
| | | | | 95/143 |
| 4,761,167 | A * | 8/1988 | Nicholas | C07C 7/12 |
| | | | | 95/98 |
| 5,204,075 | A * | 4/1993 | Jain | C01B 21/0494 |
| | | | | 423/262 |
| 5,220,797 | A * | 6/1993 | Krishnamurthy | F25J 3/0285 |
| | | | | 62/620 |
| 7,871,457 | B2 * | 1/2011 | Shah | F25J 3/0252 |
| | | | | 423/437.1 |
| 8,241,400 | B2 * | 8/2012 | Grover | C01B 3/382 |
| | | | | 95/143 |
| 2006/0272352 | A1 * | 12/2006 | Aoki | F25J 3/04036 |
| | | | | 62/646 |
| 2011/0271833 | A1 * | 11/2011 | Tentarelli | B01J 20/103 |
| | | | | 96/108 |
| 2013/0149226 | A1 * | 6/2013 | Song | F25J 3/08 |
| | | | | 423/262 |
| 2014/0338425 | A1 * | 11/2014 | Kalbassi | F25J 3/04775 |
| | | | | 73/31.07 |
| 2019/0193018 | A1 * | 6/2019 | Sanderson | B01D 53/0446 |
| 2020/0355428 | A1 * | 11/2020 | Coleman | F25J 3/0223 |
| 2024/0058744 | A1 * | 2/2024 | Song | B01D 53/261 |

\* cited by examiner

WASTE ARGON SEPARATION SYSTEM AND METHOD CAPABLE OF REDUCING EMISSION OF CRYOGENIC WASTE ARGON

CROSS REFERENCE OF RELATED APPLICATION

This application is a Continuation Application of the International Application PCT/CN2024/093087, filed on May 14, 2024, which claims priority to Chinese Patent Application No. CN 202311197417.7, filed on Sep. 18, 2023, the contents of which are incorporated herein by reference in its entirety.

FIELD OF TECHNOLOGY

The present invention provides a method for argon recovery, and particularly relates to a waste argon separation system and method capable of reducing emission of cryogenic waste argon.

BACKGROUND

At present, the low-temperature distillation process with prestage deoxidation and decarbonization technology can solve the problems of argon deficiency and high energy faced by existing photovoltaic enterprises, and reduce the production and manufacturing costs of new photovoltaic energy. The argon recovery rate of cryogenic apparatuses is generally around 85%, and there is still a large amount of waste argon gas emitted into the atmosphere, causing waste of argon.

Compared with the purification of argon separated from the atmosphere containing 1% argon to obtain high-purity argon, the waste argon gas with an argon concentration of 10-80% in the gas emitted from cryogenic waste argon is still a high-value gas source. The gas emitted from cryogenic waste argon is further recovered to purify the waste argon gas and introduce it into an inlet of an overall cryogenic argon recovery apparatus, which can improve the overall yield of the argon recovery apparatus.

The impurity gas in the waste argon gas of the low-temperature distillation process is mainly nitrogen, hydrogen, or carbon monoxide. Due to the influence of recovery of feed gas from a monocrystalline silicon furnace, the proportion of components in the impurity gas varies significantly. For example, the concentration of nitrogen fluctuates between 90% and 20%, and the concentration of hydrogen fluctuates between 1% and 4%. The pressure of the waste argon gas is related to the prestage low-temperature distillation process.

In the prior art, most of the cryogenic waste argon is emitted directly, which leads to the waste of argon from the cryogenic waste argon. However, the concentration of argon in emission gas from the cryogenic waste argon cannot meet the user's use concentration requirements. Although there are processes in the prior art that filter the emission gas by means of adsorption towers, the gas filtered by means of adsorption towers is divided into high-purity argon and residual gas. There is still a large amount of argon in the residual gas, and the concentration thereof is much higher than that of argon in the atmosphere. In the prior art, the residual gas is usually directly emitted into the atmosphere. In this way, a large amount of argon is still wasted.

SUMMARY

One advantage of the present invention is to provide a waste argon separation system and method capable of reducing emission of cryogenic waste argon. By means of the method capable of reducing emission of cryogenic waste argon, the emission of argon from cryogenic waste argon can be reduced, and the argon can be recovered more efficiently.

Another advantage of the present invention is to provide a waste argon separation system and method capable of reducing emission of cryogenic waste argon. By means of the method capable of reducing emission of cryogenic waste argon, dangerous accidents caused by excessive hydrogen can be effectively prevented when the cryogenic waste argon enters.

Another advantage of the present invention is to provide a waste argon separation system and method capable of reducing emission of cryogenic waste argon. By means of the method capable of reducing emission of cryogenic waste argon, the entering waste argon exhaust gas can be effectively prevented from penetrating a packing due to the too high flow rate. In other words, by means of the method, waste argon can slowly pass through the packing when filtered by the packing, so that it is ensured that gas can fully contact adsorption packing layers of adsorption towers, thereby improving the purity of collected argon gas.

Another advantage of the present invention is to provide a waste argon separation system and method capable of reducing emission of cryogenic waste argon. By means of the method capable of reducing emission of cryogenic waste argon, when being recovered, waste argon can be filtered in at least one tower while being regenerated in another tower by means of multi-tower connection, and when being filtered in the adsorption tower after regeneration, the waste argon is regenerated in the adsorption tower in which the waste argon is filtered previously. In this way, the adsorption capacity of adsorption packing layers in each tower can be effectively ensured, thereby improving the purity of the filtered waste argon.

Another advantage of the present invention is to provide a waste argon separation system and method capable of reducing emission of cryogenic waste argon. By means of the method capable of reducing emission of cryogenic waste argon, the emission of argon from cryogenic waste argon can be reduced effectively, thus improving the utilization rate of waste argon.

To achieve the above at least one advantage of the present invention, the present invention provides a waste argon separation system capable of reducing emission of cryogenic waste argon, including:

a valve bank, including a gas inlet valve, an analytic control valve, and at least two sewage discharge valves;

at least two adsorption towers, a top of each of the adsorption towers being provided with an argon-rich gas outlet, the argon-rich gas outlet at the top of each of the adsorption towers being connected to each other to form a regeneration channel, and the argon-rich gas outlet at the top of each of the adsorption towers being further connected to an argon-rich gas outlet channel, wherein the analytic control valve is arranged at the regeneration channel to control on and off of the regeneration channel, and a bottom of each of the adsorption towers is further provided with at least one sewage discharge opening;

sewage discharge channels having at least the same number as the adsorption towers, first end of each of the sewage discharge channels being connected to the sewage discharge opening at the bottom of each of the adsorption towers, while second end of each of the sewage discharge channels forming an emission outlet for emitting exhaust gas at the bottom of each of the adsorption towers, wherein each of the sewage discharge channels is provided with at least one of the at least two sewage discharge valves;

a gas inlet component, provided with a gas inlet and including at least two gas inlet pipelines having the same number as the adsorption towers, wherein each of the gas inlet pipelines is provided with the gas inlet valve, and two ends of each of the gas inlet pipelines are connected to the gas inlet of the gas inlet component and the bottom of the adsorption tower, respectively, so that when the gas inlet valve is opened, waste argon exhaust gas entering from the gas inlet of the gas inlet component can enter a gas inlet-in of corresponding the adsorption towers via the gas inlet pipeline and then is filtered, and when at least one of the gas inlet valves connected to at least one of the adsorption towers is opened, the adsorption towers connected to the gas inlet valves which are unopened will be in an analytic state, while corresponding the adsorption towers correspondingly connected to the opened gas inlet valves will be in an adsorption working state, and the at least two sewage discharge valves connected to the bottoms of the adsorption towers in the adsorption working state will be in a closed state, while the at least two sewage discharge valves connected to the bottoms of the adsorption towers in the analytic state will be in an opened state; and at least one argon reflux component, including at least one pressure equalizing tank and first pressure equalizing channels having the at least same number as the adsorption towers, the valve bank including a first pressure equalizing valve, wherein the first pressure equalizing valve is arranged on each of the first pressure equalizing channels, first end of each of the first pressure equalizing channels is connected to the pressure equalizing tank, and second end of each of the first pressure equalizing channels is connected to one of the adsorption towers.

According to an embodiment of the present invention, the least one argon reflux component further includes a second pressure equalizing channel, and the valve bank further includes at least one second pressure equalizing valve, wherein the second pressure equalizing valve is arranged on the second pressure equalizing channel which is between the adsorption tower in the adsorption working state and the adsorption tower in the analytic state, and the second pressure equalizing channel is used for being connected to upper middle parts of the adsorption towers.

According to an embodiment of the present invention, the least one argon reflux component further includes third pressure equalizing channels having the at least same number as the adsorption towers, the valve bank includes a third pressure equalizing valve which is arranged on each of the third pressure equalizing channels, one end of the third pressure equalizing channels is connected to the upper middle parts of the adsorption towers in the adsorption working state, and the other end thereof is connected to the bottoms of the adsorption towers in the analytic state.

According to an embodiment of the present invention, the waste argon separation system capable of reducing emission of cryogenic waste argon further includes a reduced argon tank, wherein the reduced argon tank stores argon-rich gas, and is arranged to be connected to the other end of the argon-rich gas outlet channel.

According to an embodiment of the present invention, the gas inlet component further includes at least one pressure stabilizing tank, which is arranged on the gas inlet pipelines to buffer cryogenic waste argon exhaust gas entering from the gas inlet pipelines.

According to an embodiment of the present invention, the gas inlet component further includes an inert gas inlet pipeline, one end of the inert gas inlet pipeline is connected to the gas inlet pipelines, and the other end thereof is connected to an inert gas storage tank.

According to an embodiment of the present invention, the least one argon reflux component includes the multiple third pressure equalizing channels connected to the adsorption towers in the adsorption working state and the adsorption towers in the analytic state at the same time.

According to an embodiment of the present invention, gas stored in the inert gas storage tank is inert gases such as nitrogen.

According to an embodiment of the present invention, each of the third pressure equalizing channels is arranged as a branch of the first pressure equalizing channels, and the first pressure equalizing valve and the third pressure equalizing valve are arranged as a same valve and are arranged on the branch.

According to an embodiment of the present invention, the waste argon separation system capable of reducing emission of cryogenic waste argon includes a backflow component, wherein the backflow component includes a backflow channel, a sewage storage tank, and a negative pressure pump, one end of the backflow channel is connected to the bottom of each of the adsorption towers, the other end thereof is connected to the sewage storage tank, the sewage storage tank is connected to the sewage discharge channels, the negative pressure pump is arranged to be capable of guiding waste argon in the sewage discharge channels to flow into the sewage storage tank, and to be capable of subsequently guiding the waste argon in the sewage storage tank to enter the adsorption towers from the bottoms of the adsorption towers through the backflow channel.

To achieve the above at least one advantage of the present invention, the present invention provides a waste argon separation method capable of reducing emission of cryogenic waste argon, performed by a waste argon separation system capable of reducing emission of cryogenic waste argon.

DESCRIPTION OF THE EMBODIMENTS

Figure 1:
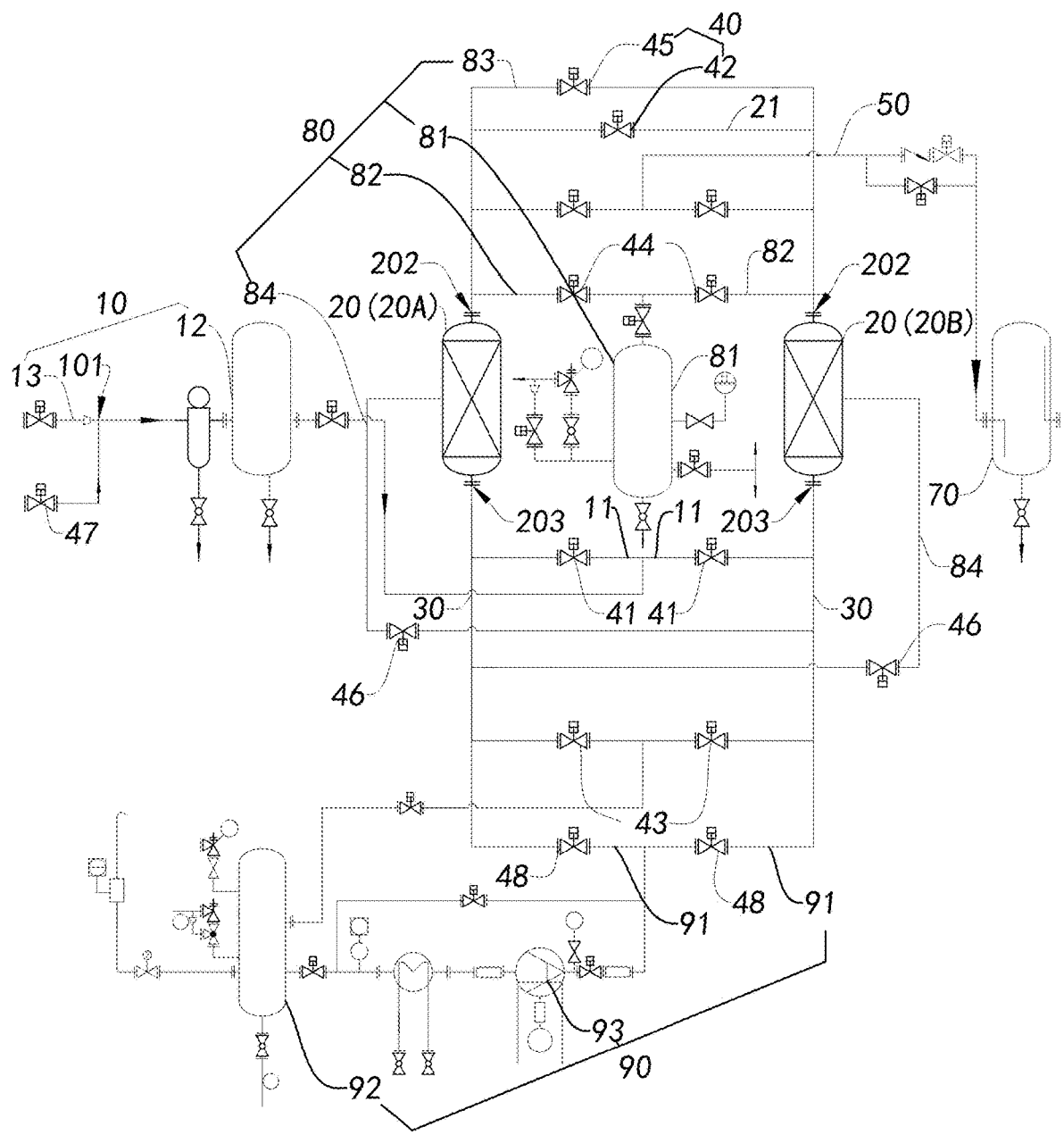
FIG. 1 shows a schematic diagram of a waste argon separation system capable of reducing emission of cryogenic waste argon of the present invention.

The following description is used to disclose the present invention to enable those skilled in the art to implement it. The preferred embodiments described below are for example only, and those skilled in the art may conceive of other obvious variations. The basic principles of the present invention defined in the following description can be applied to other implementation solutions, variation solutions, improvement solutions, equivalent solutions, and other technical solutions that do not deviate from the spirit and scope of the present invention.

Those skilled in the art should understand that in the disclosure of the present invention, the terms "longitudinal", "transverse", "upper", "lower", "front", "back", "left", "right", "vertical", "horizontal", "top", "bottom", "inside", "outside", etc. refer to the orientation or position relationship based on the orientation or position relationship shown in the drawings, which is only for the convenience of describing the present invention and simplifying the description, and not to indicate or imply that the apparatus or component referred to must have a specific orientation, be constructed and operated in a specific orientation. Therefore, the above terms cannot be understood as a limitation on the present invention.

It can be understood that the term "one" should be understood as "at least one" or "one or more", i.e., in one embodiment, the number of elements can be one, while in other embodiments, the number of elements can be multiple. The term "one" cannot be understood as a limitation on the number.

Figure 2:
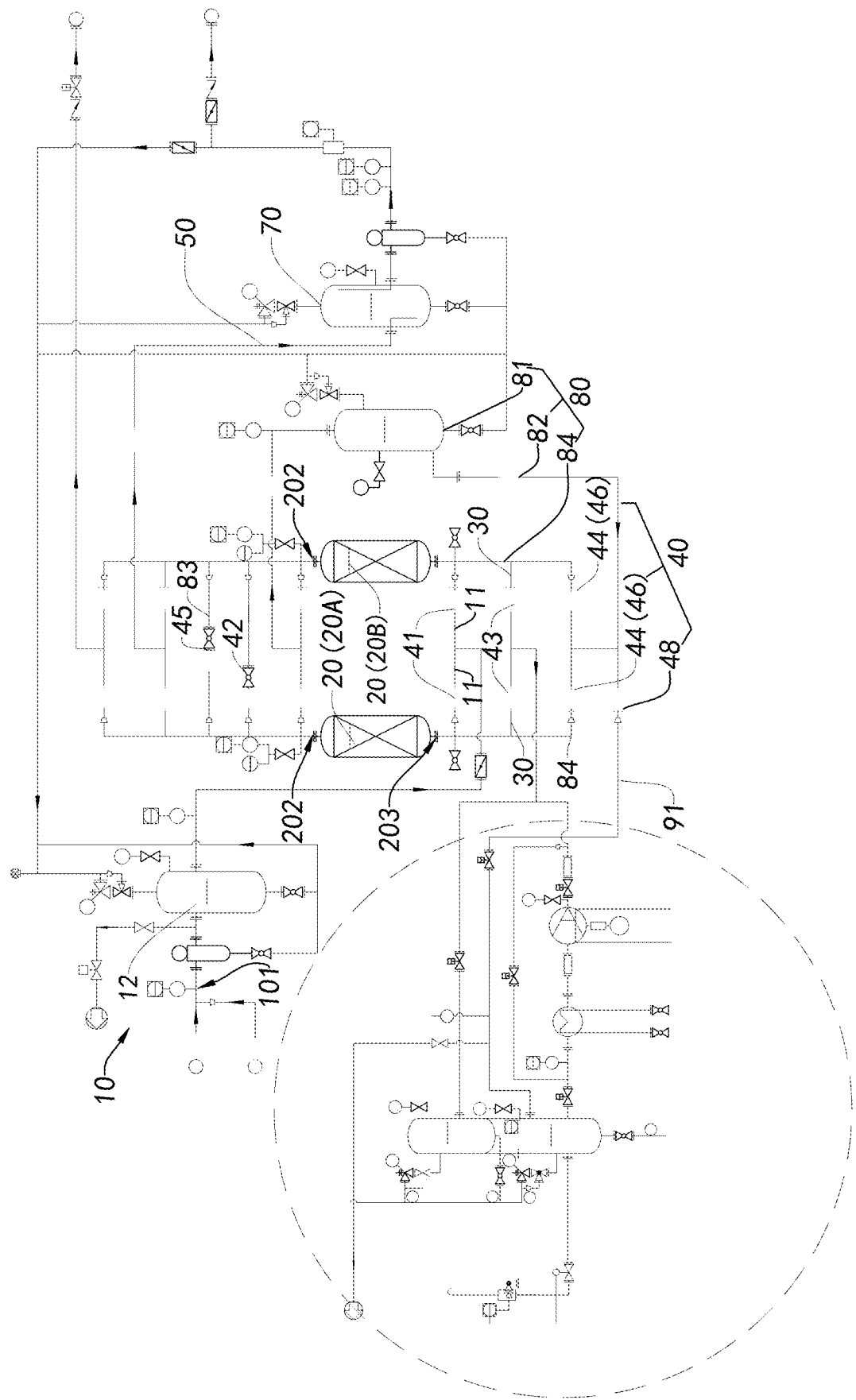
FIG. 2 shows a schematic diagram of another embodiment of a waste argon separation system capable of reducing emission of cryogenic waste argon of the present invention.
Figure 3:
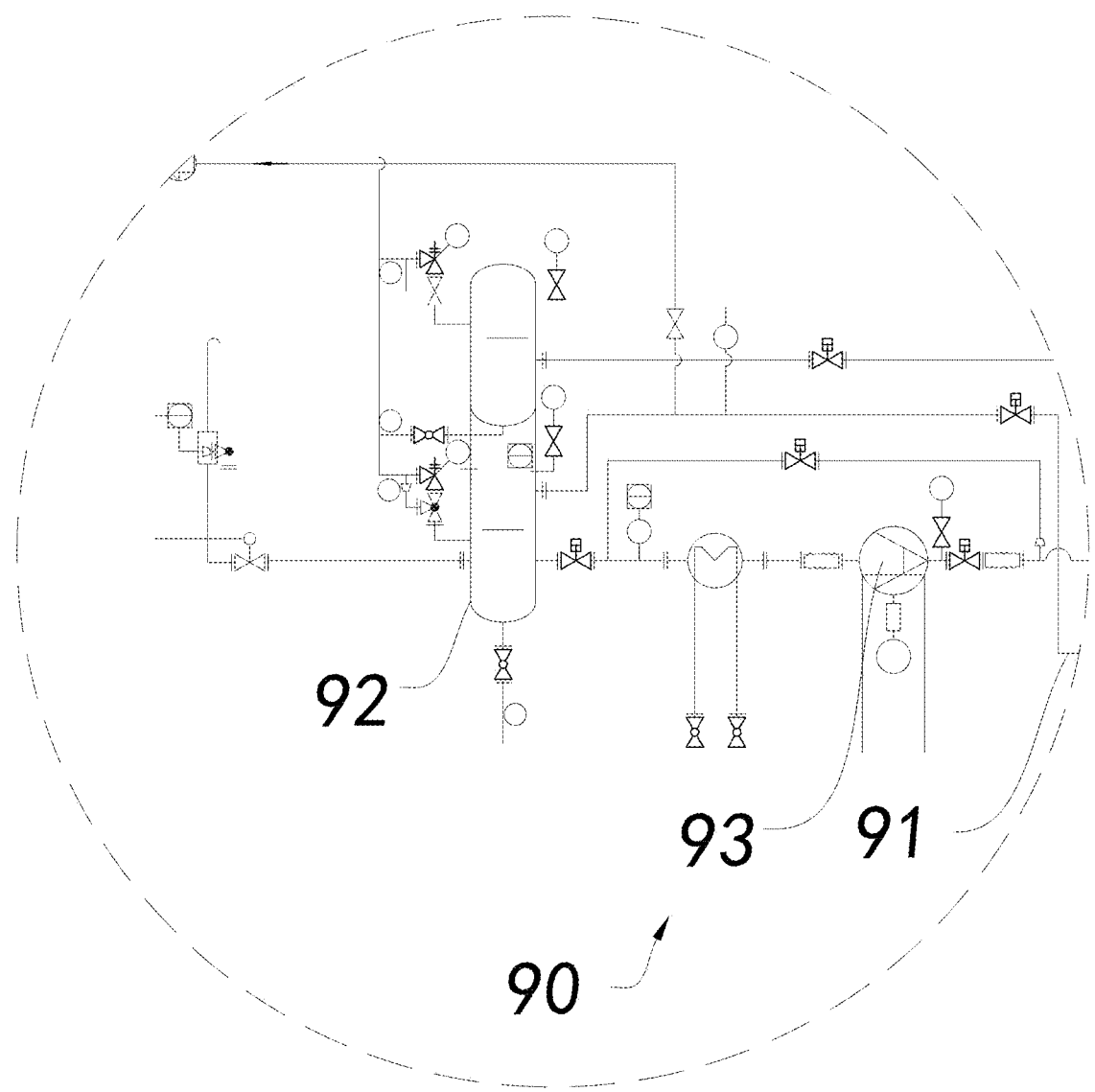
FIG. 3 shows an enlarged schematic diagram of partial structures in FIG. 2 of the waste argon separation system capable of reducing emission of cryogenic waste argon of the present invention.

Referring to FIGS. 1 to 3, a waste argon separation system capable of reducing emission of cryogenic waste argon according to a preferred embodiment of the present invention will be elaborated in detail below. The waste argon separation system capable of reducing emission of cryogenic waste argon can treat cryogenic waste argon exhaust gas and reduce the content of waste argon in finally emitted exhaust gas during treatment, thereby improving the recovery rate of waste argon.

Specifically, the waste argon separation system capable of reducing emission of cryogenic waste argon includes a gas inlet component 10, at least two adsorption towers 20, and a valve bank 40.

As shown in FIG. 1, the valve bank 40 includes a gas inlet valve 41. The gas inlet component 10 is provided with a gas inlet 101 and includes at least two gas inlet pipelines 11 having the same number as the adsorption towers 20, wherein each of the gas inlet pipelines 11 is provided with the gas inlet valve 41, and two ends of each of the gas inlet pipelines 11 are connected to the gas inlet 101 and the bottom of the adsorption tower 20, respectively, so that when the gas inlet valve 41 is opened, waste argon exhaust gas entering from the gas inlet 101 can enter a gas inlet 101 in the corresponding adsorption tower 20 via the gas inlet pipeline 11 and then is filtered.

It is worth mentioning that those skilled in the art can understand that each of the adsorption towers 20 is provided with an adsorption packing layer, wherein the adsorption packing layer is used to adsorb gases other than argon in exhaust gas, such as hydrogen, etc. In this way, the exhaust gas passing through the adsorption towers 20 from bottom to top can be filtered to obtain argon-rich gas.

A top of each of the adsorption towers 20 is provided with an argon-rich gas outlet 202, and the argon-rich gas outlet 202 at the top of each of the adsorption towers 20 is connected to each other to form a regeneration channel 21. Meanwhile, the argon-rich gas outlet 202 at the top of each of the adsorption towers 20 is further connected to an argon-rich gas outlet channel 50.

It is worth mentioning that the valve bank 40 further includes an analytic control valve 42, wherein the analytic control valve 42 is arranged at the regeneration channel 21 to control on and off of the regeneration channel 21.

In addition, a bottom of each of the adsorption towers 20 is further provided with at least one sewage discharge opening 203. Accordingly, the waste argon separation system capable of reducing emission of cryogenic waste argon further includes sewage discharge channels 30 having at least the same number as the adsorption towers 20. One end of each of the sewage discharge channels 30 is connected to the sewage discharge opening 203 at the bottom of each of the adsorption towers 20, while the other end thereof forms an emission outlet for emitting exhaust gas at the bottom of each of the adsorption towers 20.

The valve bank 40 further includes sewage discharge valves 43 having the same number as the adsorption towers 20, wherein each of the sewage discharge channels 30 is provided with the at least one sewage discharge valve 43.

It is worth mentioning that when at least one of the gas inlet valves 41 connected to at least one of the adsorption towers 20 is opened, the other adsorption towers 20 connected to the unopened gas inlet valves 41 will be in an analytic state. However, the corresponding adsorption towers 20 connected to the correspondingly opened gas inlet valves 41 will be in an adsorption working state. The sewage discharge valves 43 connected to the bottoms of the adsorption towers 20 in the adsorption working state will be in a closed state, while the sewage discharge valves 43 connected to the bottoms of the adsorption towers 20 in the analytic state will be in an opened state.

Those skilled in the art can understand that in this way, the adsorption towers 20 in the adsorption working state can be used to filter waste argon exhaust gas, and at the same time, a portion of argon-rich gas formed by the filtration in the adsorption working state can flow to other adsorption towers 20 in the analytic state in a top-down manner via the regeneration channel 21. In this way, the adsorption towers 20 in the adsorption working state can be used to filter cryogenic waste argon exhaust gas, and when the argon-rich gas flowing from top to bottom is regenerated in the adsorption towers 20 in the analytic state, the exhaust gas adsorbed by an adsorbent in the corresponding adsorption towers 20 in the analytic state can be analyzed and emitted from the bottoms of the adsorption towers 20 in the analytic state from top to bottom via the sewage discharge channels 30.

In this way, by regularly switching between the adsorption towers 20 in the analytic state and in the adsorption state, the cryogenic waste argon exhaust gas can be filtered.

Meanwhile, a portion of the argon-rich gas can be emitted from the argon-rich gas outlets 202 at the tops of the adsorption towers 20 in the adsorption working state via the argon-rich gas outlet channel 50. The argon-rich gas emitted from the argon-rich gas outlet channel 50 can be directly used by the user or collected and stored by a collection tank.

Specifically, as shown in FIG. 2, when the gas inlet valve 41 corresponding to the adsorption tower 20A is opened, the adsorption tower 20A will be in an adsorption working state. Since the gas inlet valve 41 corresponding to the adsorption tower 20B is closed, the adsorption tower 20B will be in an analytic state.

Preferably, the waste argon separation system capable of reducing emission of cryogenic waste argon further includes a reduced argon tank 70, wherein the reduced argon tank 70 stores argon-rich gas, and is arranged to be connected to the other end of the argon-rich gas outlet channel 50, so that when cryogenic waste argon exhaust gas is introduced into the adsorption towers 20 through the gas inlet component 10 at the beginning, the argon-rich gas stored in the reduced argon tank 70 can counteract from top to bottom the waste argon exhaust gas entering from bottom to top from the gas inlets 101 of the adsorption towers 20 in the adsorption working state.

In this way, the entering cryogenic waste argon exhaust gas can slowly flow through adsorption packing layers of the adsorption towers 20 in the adsorption working state, so that the waste argon exhaust gas can fully contact the adsorption packing layers of the adsorption towers 20 in the adsorption working state, thereby improving the filtration effect of the cryogenic waste argon exhaust gas and improving the purity of argon in the filtered argon-rich gas.

Also as a preference, the gas inlet component 10 further includes at least one pressure stabilizing tank 12, which is arranged on the gas inlet pipelines 11 and located between the gas inlet 101 and the bottoms of the adsorption towers 20, to buffer cryogenic waste argon exhaust gas entering from the gas inlet pipelines 11.

More preferably, the gas inlet component 10 further includes an inert gas inlet pipeline 13, one end of the inert gas inlet pipeline 13 is connected to the gas inlet pipelines 11, and the other end thereof is connected to an inert gas storage tank, such that inert gas is introduced into the gas inlet pipelines 11 and the adsorption towers 20 before cryogenic waste argon exhaust gas is emitted into the gas inlet pipelines 11, so as to exhaust air in the gas inlet pipelines 11 and the adsorption towers 20, thereby avoiding explosion due to mixing of excessive oxygen in the gas inlet pipelines 11 and the adsorption towers 20 and the cryogenic waste argon exhaust gas containing hydrogen and other waste gases after entering the gas inlet pipelines and the adsorption towers.

Those skilled in the art can understand that gas stored in the inert gas storage tank is inert gases such as nitrogen.

Furthermore, the waste argon separation system capable of reducing emission of cryogenic waste argon further includes at least one argon reflux component 80. Specifically, the argon reflux component 80 includes at least one pressure equalizing tank 81 and first pressure equalizing channels 82 having the at least same number as the adsorption towers 20. The valve bank 40 includes a first pressure equalizing valve 44, wherein the first pressure equalizing valve 44 is arranged on each of the first pressure equalizing channels 82. One end of each of the first pressure equalizing channels 82 is connected to the pressure equalizing tank 81, and the other end thereof is connected to the top of the one adsorption tower 20. In an example shown in FIG. 1, the other end of each of the first pressure equalizing channels 82 is connected to the top of the one adsorption tower 20. In another embodiment, the other end of each of the first pressure equalizing channels 82 is connected to the bottom of the one adsorption tower 20, as shown in FIG. 2.

Preferably, the argon reflux component 80 further includes a second pressure equalizing channel 83 for connecting the adsorption tower 20 in the adsorption working state and the adsorption tower 20 in the analytic state. The valve bank 40 further includes at least one second pressure equalizing valve 45, which is arranged on the second pressure equalizing channel 83. The second pressure equalizing channel 83 is used for being connected to the upper middle part of the adsorption tower 20.

After the adsorption tower 20 in the adsorption working state completes the adsorption, the adsorption tower 20 in the analytic state completes the analysis at the same time. Correspondingly, the gas inlet valves 41, the sewage discharge valves 43, and the analytic control valve 42 are all closed.

Preferably, the first pressure equalizing valve 44 and the second pressure equalizing valve 45 are controlled to be opened, so that the argon-rich gas in the adsorption tower 20 which has just completed the adsorption working state can be evenly delivered, through the first pressure equalizing valve 44 and the second pressure equalizing valve 45, to the pressure equalizing tank 81 and another adsorption tower 20 which has just completed the analysis.

Those skilled in the art can understand that in this way, the amount of gas retained in the adsorption tower 20 which has just completed the adsorption working state can be reduced, so that when the adsorption tower 20 which has just completed the adsorption work subsequently switches to the analytic state, the amount of exhaust gas emitted will be reduced, thereby reducing the content of argon in the emitted exhaust gas. In this way, the recovery rate of argon can be improved.

More preferably, the argon reflux component 80 further includes third pressure equalizing channels 84 having the at least same number as the adsorption towers 20. Correspondingly, the valve bank 40 includes a third pressure equalizing valve 46. The third pressure equalizing valve 46 is arranged on each of the third pressure equalizing channels 84. One end of the third pressure equalizing channels 84 is connected to the upper middle parts of the adsorption towers 20 in the adsorption working state, and the other end thereof is connected to the bottoms of the adsorption towers 20 in the analytic state.

It is worth mentioning that after the adsorption tower 20 in the adsorption working state completes the adsorption, the adsorption tower 20 in the analytic state completes the analysis at the same time. Correspondingly, the gas inlet valves 41, the sewage discharge valves 43, and the analytic control valve 42 are all closed.

The third pressure equalizing valve 46 on the third pressure equalizing channel 84 connected to the adsorption tower 20 which has just completed the adsorption work is opened, allowing the relatively-high-quality argon-rich gas in the upper middle part of the adsorption tower 20 which has just completed the adsorption work to flow from bottom to top towards the adsorption tower 20 which has just completed the analysis. In this way, flowing into the adsorption packing layer in the adsorption tower 20 which has just completed the analysis can not only further filter the exhaust gas in the argon-relatively-rich gas to obtain the argon-rich gas, but also transfer more gas at the bottom of the adsorption tower 20 which has just completed the adsorption work to the adsorption tower 20 which has just completed the analysis. In this way, when the adsorption tower 20 which has just completed the adsorption work subsequently switches to the analytic state, the amount of exhaust gas emitted will be reduced, thereby reducing the content of argon in the emitted exhaust gas and improving the recovery rate of cryogenic waste argon, and at the same time, ensuring the purity of the finally obtained argon-rich gas.

Preferably, the argon reflux component 80 further includes the multiple third pressure equalizing channels 84 connected to the adsorption towers 20 in the adsorption working state and the adsorption towers in the analytic state at the same time.

In a preferred embodiment shown in FIG. 2, each of the third pressure equalizing channels 84 is arranged as a branch of the first pressure equalizing channels 82, and the first pressure equalizing valve 44 and the third pressure equalizing valve 46 are arranged as a same valve and are arranged on the branch. In this way, not only can waste argon reflux multiple times, but also the complexity of pipeline design can be reduced.

Preferably, the inert gas inlet pipeline is provided with at least one gas blowing control valve 47.

As a preference, in the second embodiment of the present invention, the waste argon separation system capable of reducing emission of cryogenic waste argon further includes a backflow component 90, wherein the backflow component 90 includes a backflow channel 91, a sewage storage tank 92, and a negative pressure pump 93.

One end of the backflow channel 91 is connected to the bottom of each of the adsorption towers 20, the other end thereof is connected to the sewage storage tank 92. The sewage storage tank 92 is connected to the sewage discharge channels 30. The negative pressure pump 93 is arranged to be capable of guiding waste argon in the sewage discharge channels 30 to flow into the sewage storage tank 92, and to be capable of subsequently guiding the waste argon in the sewage storage tank 92 to enter the adsorption towers 20 from the bottoms of the adsorption towers 20 through the backflow channel 91. The entering waste argon is purified again after being adsorbed by the adsorption towers 20. In this way, the content of argon in the finally emitted exhaust gas can be effectively reduced, thereby effectively improving the recovery rate of argon. It is worth mentioning that a control valve 48 is arranged on the backflow channel 91. It is also worth mentioning that after the adsorption tower 20 in the adsorption state completes the adsorption and pressure equalization, the negative pressure pump 93 and the control valve 48 are opened, so that the waste argon in the sewage storage tank 92 can enter the adsorption tower 20 from the bottom of the adsorption tower 20 through the backflow channel 91.

As shown in FIG. 2, as a preference, one end of the backflow channel 91 is connected to a main path of the first pressure equalizing channels 82, and thus can be connected to the adsorption towers 20 by means of the branches of the branch of the first pressure equalizing channels 82, i.e., the third pressure equalizing channels 84. Similarly, in this way, not only can waste argon reflux multiple times, but also the complexity of pipeline design can be reduced.

Those skilled in the art should understand that the above description and the embodiments of the present invention shown in the drawings are merely examples and do not limit the present invention. The advantages of the present invention have been fully and effectively realized. The functions and structural principles of the present invention have been demonstrated and explained in the embodiments, and without deviating from the principles, the implementations of the present invention may have any deformation or modification.

What is claimed is:

1. A waste argon separation system capable of reducing emission of cryogenic waste argon, comprising:
a valve bank, comprising a gas inlet valve, an analytic control valve, and at least two sewage discharge valves;
at least two adsorption towers, a top of each of the adsorption towers being provided with an argon-rich gas outlet, the argon-rich gas outlet at the top of each of the adsorption towers being connected to each other to form a regeneration channel, and the argon-rich gas outlet at the top of each of the adsorption towers being further connected to an argon-rich gas outlet channel, wherein the analytic control valve is arranged at the regeneration channel to control on and off of the regeneration channel, and a bottom of each of the adsorption towers is further provided with at least one sewage discharge opening;
sewage discharge channels having at least the same number as the adsorption towers, first end of each of the sewage discharge channels being connected to the sewage discharge opening at the bottom of each of the adsorption towers, while second end of each of the sewage discharge channels forming an emission outlet for emitting exhaust gas at the bottom of each of the adsorption towers, wherein each of the sewage discharge channels is provided with at least one of the at least two sewage discharge valves;
a gas inlet component, provided with a gas inlet and comprising at least two gas inlet pipelines having the same number as the adsorption towers, wherein each of the gas inlet pipelines is provided with the gas inlet valve, and two ends of each of the gas inlet pipelines are connected to the gas inlet of the gas inlet component and the bottom of the adsorption towers, respectively, so that when the gas inlet valve is opened, waste argon exhaust gas entering from the gas inlet of the gas inlet component can enter a gas inlet-in of corresponding the adsorption towers via the gas inlet pipeline and then is filtered, and when at least one of the gas inlet valves connected to at least one of the adsorption towers is opened, the adsorption towers connected to the gas inlet valves which are unopened will be in an analytic state, while corresponding the adsorption towers correspondingly connected to the opened gas inlet valves will be in an adsorption working state, and the at least two sewage discharge valves connected to the bottoms of the adsorption towers in the adsorption working state will be in a closed state, while and the at least two sewage discharge valves connected to the bottoms of the adsorption towers in the analytic state will be in an opened state; and
at least one argon reflux component, comprising at least one pressure equalizing tank and first pressure equalizing channels having the at least same number as the adsorption towers, the valve bank comprising a first pressure equalizing valve, wherein the first pressure equalizing valve is arranged on each of the first pressure equalizing channels, one first end of each of the first pressure equalizing channels is connected to the pressure equalizing tank, and second end of each of the first pressure equalizing channels is connected to the top of one of the adsorption towers.

2. The waste argon separation system capable of reducing emission of cryogenic waste argon according to claim 1, wherein the least one argon reflux component further comprises a second pressure equalizing channel, and the valve bank further comprises at least one second pressure equalizing valve, wherein the second pressure equalizing valve is arranged on the second pressure equalizing channel which is between the adsorption tower in the adsorption working state and the adsorption tower in the analytic state, and the second pressure equalizing channel is connected to upper middle parts of all the adsorption towers.

3. The waste argon separation system capable of reducing emission of cryogenic waste argon according to claim 2, wherein the least one argon reflux component further comprises third pressure equalizing channels having the at least same number as the adsorption towers, the valve bank comprises a third pressure equalizing valve which is arranged on each of the third pressure equalizing channels, one end of the third pressure equalizing channels is connected to the upper middle parts of the adsorption towers in the adsorption working state, and the other end thereof is connected to the bottoms of the adsorption towers in the analytic state.

4. The waste argon separation system capable of reducing emission of cryogenic waste argon according to claim 1, further comprising a reduced argon tank, wherein the reduced argon tank stores argon-rich gas, and is arranged to be connected to the other end of the argon-rich gas outlet channel.

5. The waste argon separation system capable of reducing emission of cryogenic waste argon according to claim 1, wherein the gas inlet component further comprises at least one pressure stabilizing tank, which is arranged on the gas inlet pipelines to buffer cryogenic waste argon exhaust gas entering from the gas inlet pipelines.

6. The waste argon separation system capable of reducing emission of cryogenic waste argon according to claim 1, wherein the gas inlet component further comprises an inert gas inlet pipeline, one end of the inert gas inlet pipeline is connected to the gas inlet pipelines, and the other end thereof is connected to an inert gas storage tank.

7. The waste argon separation system capable of reducing emission of cryogenic waste argon according to claim 3, wherein the least one argon reflux component comprises the multiple third pressure equalizing channels connected to the adsorption towers in the adsorption working state and the adsorption towers in the analytic state at the same time.

8. The waste argon separation system capable of reducing emission of cryogenic waste argon according to claim 6, wherein gas stored in the inert gas storage tank is nitrogen.

9. The waste argon separation system capable of reducing emission of cryogenic waste argon according to claim 3, wherein each of the third pressure equalizing channels is arranged as a branch of the first pressure equalizing channels, and the first pressure equalizing valve and the third pressure equalizing valve are arranged as a same valve and are arranged on the branch.

10. The waste argon separation system capable of reducing emission of cryogenic waste argon according to claim 1, comprising a backflow component, wherein the backflow component comprises a backflow channel, a sewage storage tank, and a negative pressure pump, one end of the backflow channel is connected to the bottom of each of the adsorption towers, the other end thereof is connected to the sewage storage tank, the sewage storage tank is connected to the sewage discharge channels, the negative pressure pump is arranged to be capable of guiding waste argon in the sewage discharge channels to flow into the sewage storage tank, and to be capable of subsequently guiding the waste argon in the sewage storage tank to enter the adsorption towers from the bottoms of the adsorption towers through the backflow channel.

11. A waste argon separation method capable of reducing emission of cryogenic waste argon, performed by a waste argon separation system capable of reducing emission of cryogenic waste argon, wherein the waste argon separation system capable of reducing emission of cryogenic waste argon comprises:
  a valve bank, comprising a gas inlet valve, an analytic control valve, and at least two sewage discharge valves;
  at least two adsorption towers, a top of each of the adsorption towers being provided with an argon-rich gas outlet, the argon-rich gas outlet at the top of each of the adsorption towers being connected to each other to form a regeneration channel, and the argon-rich gas outlet at the top of each of the adsorption towers being further connected to an argon-rich gas outlet channel, wherein the analytic control valve is arranged at the regeneration channel to control on and off of the regeneration channel, and a bottom of each of the adsorption towers is further provided with at least one sewage discharge opening;
  sewage discharge channels having at least the same number as the adsorption towers, first end of each of the sewage discharge channels being connected to the sewage discharge opening at the bottom of each of the adsorption towers, while second end of each of the sewage discharge channels forming an emission outlet for emitting exhaust gas at the bottom of each of the adsorption towers, wherein each of the sewage discharge channels is provided with at least one of the at least two sewage discharge valves;
  a gas inlet component, provided with a gas inlet and comprising at least two gas inlet pipelines having the same number as the adsorption towers, wherein each of the gas inlet pipelines is provided with the gas inlet valve, and two ends of each of the gas inlet pipelines are connected to the gas inlet of the gas inlet component and the bottom of the adsorption towers, respectively, so that when the gas inlet valve is opened, waste argon exhaust gas entering from the gas inlet of the gas inlet component can enter a gas inlet of corresponding the adsorption towers via the gas inlet pipeline and then is filtered, and when at least one of the gas inlet valves connected to at least one of the adsorption towers is opened, the adsorption towers connected to the gas inlet valves which are unopened will be in an analytic state, while corresponding the adsorption towers correspondingly connected to the opened gas inlet valves will be in an adsorption working state, and the at least two sewage discharge valves connected to the bottoms of the adsorption towers in the adsorption working state will be in a closed state, while and the at least two sewage discharge valves connected to the bottoms of the adsorption towers in the analytic state will be in an opened state; and
  at least one argon reflux component, comprising at least one pressure equalizing tank and first pressure equalizing channels having the at least same number as the adsorption towers, the valve bank comprising a first pressure equalizing valve, wherein the first pressure equalizing valve is arranged on each of the first pressure equalizing channels, first end of each of the first pressure equalizing channels is connected to the pressure equalizing tank, and second end of each of the first pressure equalizing channels is connected to the top of one of the adsorption towers,
  wherein the waste argon separation method capable of reducing emission of cryogenic waste argon comprises:
  opening at least one gas inlet valve to change the adsorption towers correspondingly connected to the opened gas inlet valve to be in the adsorption working state, at the same time, closing at least one another gas inlet valve, and opening the analytic control valve, to change the another adsorption towers correspondingly connected to the closed gas inlet valve to be in the analytic state and to change the at least two sewage discharge valves connected to the bottoms of the adsorption towers in the adsorption working state to be in the closed state, while to change the at least two sewage discharge valves connected to the bottoms of the adsorption towers in the analytic state to be in the opened state;
  opening the first pressure equalizing valve, so that the argon-rich gas in the adsorption towers which have just completed the adsorption working state can be evenly delivered, through the first pressure equalizing valve to the pressure equalizing tank.

12. The waste argon separation method capable of reducing emission of cryogenic waste argon according to claim 11, wherein the the least one argon reflux component further comprises a second pressure equalizing channel, and the valve bank further comprises at least one second pressure equalizing valve, wherein the second pressure equalizing valve is arranged on the second pressure equalizing channel which is between the adsorption tower in the adsorption working state and the adsorption tower in the analytic state, and the second pressure equalizing channel is connected to upper middle parts of all the adsorption towers, wherein the waste argon separation method capable of reducing emission of cryogenic waste argon comprises:

opening the second pressure equalizing valve, so that the argon-rich gas in the adsorption towers which have just completed the adsorption working state can be evenly delivered, through the second pressure equalizing valve to the pressure equalizing tank.

13. The waste argon separation method capable of reducing emission of cryogenic waste argon according to claim 11, wherein the least one argon reflux component further comprises third pressure equalizing channels having the at least same number as the adsorption towers, the valve bank comprises a third pressure equalizing valve which is arranged on each of the third pressure equalizing channels, one end of the third pressure equalizing channels is connected to the upper middle parts of the adsorption towers in the adsorption working state, and the other end thereof is connected to the bottoms of the adsorption towers in the analytic state, wherein the waste argon separation method capable of reducing emission of cryogenic waste argon comprises:

opening the third pressure equalizing valve on the third pressure equalizing channel connected to the adsorption tower which has just completed the adsorption work, for allowing the relatively-high-quality argon-rich gas in the upper middle part of the adsorption tower which has just completed the adsorption work to flow from bottom to top towards the adsorption tower which has just completed the analysis.

14. The waste argon separation method capable of reducing emission of cryogenic waste argon according to claim 11, wherein the backflow component comprises a backflow channel, a sewage storage tank, and a negative pressure pump, one end of the backflow channel is connected to the bottom of each of the adsorption towers, the other end thereof is connected to the sewage storage tank, the sewage storage tank is connected to the sewage discharge channels, the negative pressure pump is arranged to be capable of guiding waste argon in the sewage discharge channels to flow into the sewage storage tank, wherein the waste argon separation method capable of reducing emission of cryogenic waste argon comprises:

opening the negative pressure pump to guide the waste argon in the sewage storage tank to enter the adsorption towers from the bottoms of the adsorption towers through the backflow channel at a later time.

15. The waste argon separation method capable of reducing emission of cryogenic waste argon according to claim 11, wherein the gas inlet component further comprises an inert gas inlet pipeline, one end of the inert gas inlet pipeline is connected to the gas inlet pipelines, and the other end thereof is connected to an inert gas storage tank, wherein the waste argon separation method capable of reducing emission of cryogenic waste argon comprises:

passing through the inert gas into the gas inlet pipelines and the adsorption towers.

16. A waste argon separation system capable of reducing emission of cryogenic waste argon, comprising:

a valve bank, comprising a gas inlet valve, an analytic control valve, and at least two sewage discharge valves;

at least two adsorption towers, a top of each of the adsorption towers being provided with an argon-rich gas outlet, the argon-rich gas outlet at the top of each of the adsorption towers being connected to each other to form a regeneration channel, and the argon-rich gas outlet at the top of each of the adsorption towers being further connected to an argon-rich gas outlet channel, wherein the analytic control valve is arranged at the regeneration channel to control on and off of the regeneration channel, and a bottom of each of the adsorption towers is further provided with at least one sewage discharge opening;

sewage discharge channels having at least the same number as the adsorption towers, one end of each of the sewage discharge channels being connected to the sewage discharge opening at the bottom of each of the adsorption towers, while the other end thereof forming an emission outlet for emitting exhaust gas at the bottom of each of the adsorption towers, wherein each of the sewage discharge channels is provided with at least one of the at least two sewage discharge valves;

a gas inlet component, provided with a gas inlet and comprising at least two gas inlet pipelines having the same number as the adsorption towers, wherein each of the gas inlet pipelines is provided with the gas inlet valve, and two ends of each of the gas inlet pipelines are connected to the gas inlet of the gas inlet component and the bottom of the adsorption towers, respectively, so that when the gas inlet valve is opened, waste argon exhaust gas entering from the gas inlet of the gas inlet component can enter a gas inlet-in of corresponding the adsorption towers via the gas inlet pipeline and then is filtered, and when at least one of the gas inlet valves connected to at least one of the adsorption towers is opened, the adsorption towers connected to the gas inlet valves which are unopened will be in an analytic state, while corresponding the adsorption towers correspondingly connected to the opened gas inlet valves will be in an adsorption working state, and the at least two sewage discharge valves connected to the bottoms of the adsorption towers in the adsorption working state will be in a closed state, while and the at least two sewage discharge valves connected to the bottoms of the adsorption towers in the analytic state will be in an opened state; and a backflow component, wherein the backflow component comprises a backflow channel, a sewage storage tank, and a negative pressure pump, one end of the backflow channel is connected to the bottom of each of the adsorption towers, the other end thereof is connected to the sewage storage tank, the sewage storage tank is connected to the sewage discharge channels, the negative pressure pump is arranged to be capable of guiding waste argon in the sewage discharge channels to flow into the sewage storage tank, and to be capable of subsequently guiding the waste argon in the sewage storage tank to enter the adsorption towers from the bottoms of the adsorption towers through the backflow channel.

* * * * *